(12) United States Patent
Bayley

(10) Patent No.: US 6,189,920 B1
(45) Date of Patent: Feb. 20, 2001

(54) STEERING WHEEL WITH AIR BAG MODULE

(75) Inventor: Gregory S. Bayley, Dryden, MI (US)

(73) Assignee: TRW Vehicle Safety Systems Inc., Lyndhurst, OH (US)

( * ) Notice: Under 35 U.S.C. 154(b), the term of this patent shall be extended for 0 days.

(21) Appl. No.: 09/484,162

(22) Filed: Jan. 18, 2000

(51) Int. Cl.[7] .................................................. B60R 21/20
(52) U.S. Cl. ............................................ 280/731; 403/348
(58) Field of Search ................................ 280/731, 728.2; 403/348, 349

(56) References Cited

U.S. PATENT DOCUMENTS

| | | | |
|---|---|---|---|
| 5,277,442 | * | 1/1994 | Cuevas .................................. 280/731 |
| 5,409,256 | * | 4/1995 | Gordon et al. ........................ 280/731 |
| 5,427,406 | | 6/1995 | Zushi et al. . |
| 5,445,406 | | 8/1995 | Jones . |
| 5,508,481 | | 4/1996 | Williams et al. . |

FOREIGN PATENT DOCUMENTS 9951465   10/1999  (WO) .

* cited by examiner

Primary Examiner—Peter C. English
(74) Attorney, Agent, or Firm—Tarolli, Sundheim, Covell, Tummino & Szabo L.L.P.

(57) ABSTRACT

An air bag module (12) for mounting on a steering wheel (10) includes an air bag (102), an inflator (100) for inflating the air bag, and a cover (104) for covering the air bag and the inflator. The module (12) has an uninstalled condition and has an installed condition in which the module is fixed to the steering wheel (10) for rotation with the steering wheel about a steering axis (22). The module (12) is rotatable in a first direction (26) relative to the steering wheel (10) to move the module from the uninstalled condition to the installed condition. The apparatus further comprises retainer structure (44, 110) for retaining the module (12) on the steering wheel (10) and for blocking movement of the module relative to the steering wheel from the installed condition to the uninstalled condition.

9 Claims, 2 Drawing Sheets

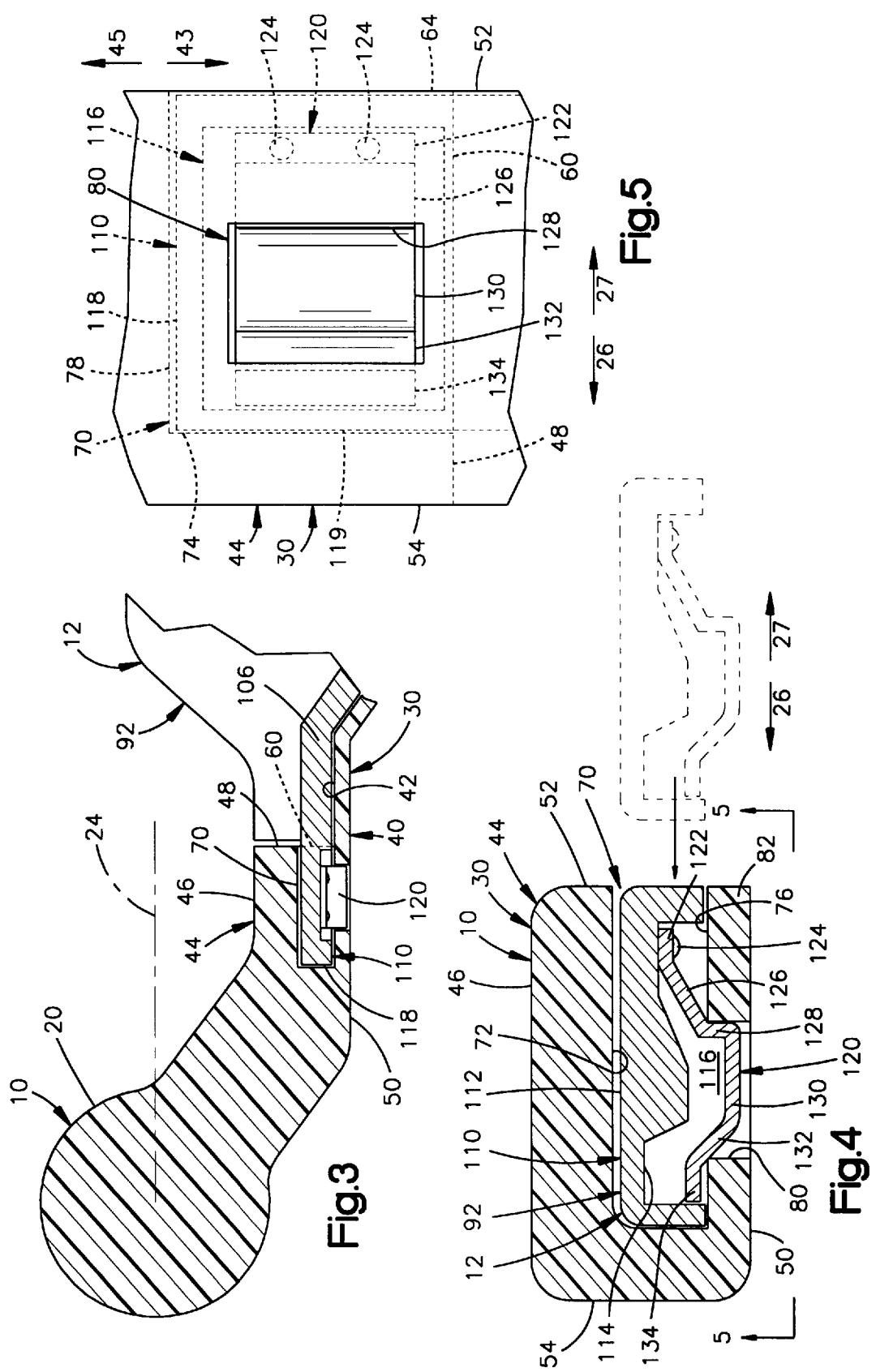

STEERING WHEEL WITH AIR BAG MODULE

BACKGROUND OF THE INVENTION

1. Technical Field

The present invention relates to a driver's side air bag module and, in particular, to the mounting of an air bag module on a vehicle steering wheel.

2. Description of the Prior Art

It is known to mount an air bag module on a vehicle steering wheel. The module includes an air bag, an inflator for inflating the air bag, and a cover for covering the inflator and the air bag. The inflator is actuatable to inflate the air bag into a position to help protect the driver of the vehicle.

An air bag module is typically mounted on a steering wheel with specialized fasteners, and significant time is associated with the fastening process. It would be desirable to eliminate the need for such fasteners and to minimize the time involved.

SUMMARY OF THE INVENTION

The present invention is an apparatus comprising a steering wheel that can be mounted in a vehicle for rotation about a steering axis of the vehicle. The apparatus also comprises an air bag module including an air bag, an inflator for inflating the air bag, and a cover for covering the air bag and the inflator. The module has an uninstalled condition and has an installed condition in which the module is fixed to the steering wheel for rotation with the steering wheel about the steering axis. The module is rotatable in a first direction relative to the steering wheel to move the module from the uninstalled condition to the installed condition. The apparatus further comprises retainer structure for retaining the module on the steering wheel and for blocking movement of the module relative to the steering wheel from the installed condition to the uninstalled condition.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a sectional view taken generally along line 3—3 of FIG. 2;

FIG. 4 is a sectional view taken generally along line 4—4 of FIG. 2; and

FIG. 5 is a sectional view taken generally along line 5—5 of FIG. 4.

DETAILED DESCRIPTION OF AN EMBODIMENT OF THE INVENTION

Figure 1:
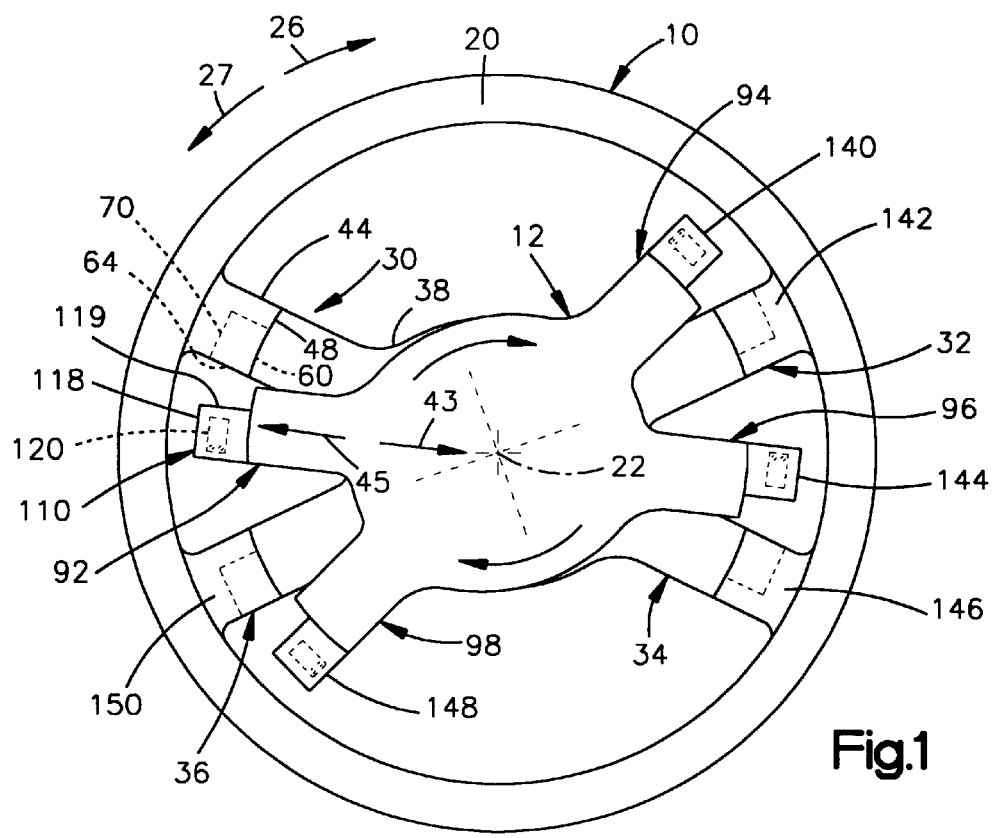
FIG. 1 is a plan view, partially in section, of a vehicle steering wheel and an air bag module, the module being shown in an uninstalled condition adjacent to the steering wheel.

The present invention relates to a driver's side air bag module and, in particular, to the mounting of an air bag module on a vehicle steering wheel. The present invention is applicable to various steering wheel and air bag module constructions. As representative of the present invention, FIG. 1 illustrates a steering wheel 10 on which an air bag module 12 can be mounted. The steering wheel 10 is mounted in a vehicle (not shown) to effect steering movement of the vehicle upon rotation of the steering wheel.

The steering wheel 10 is rotatable about an axis 22. A rim 20 of the steering wheel 10 lies in a plane of rotation 24 that is perpendicular to the axis 22. When the steering wheel 10 is rotated about the axis 22, all the parts of the steering wheel, and of the air bag module 12, rotate in planes that are parallel to the plane of rotation 24 of the rim 20. (A clockwise direction of rotation is indicated by the arrow 26 in the drawings. A counter-clockwise direction of rotation is indicated by the arrow 27.)

The steering wheel 10 has four spokes 30, 32, 34 and 36 that extend in a radially inward direction 43 from the rim 20 to a central portion 38 of the steering wheel. The four spokes 30, 32, 34 and 36 are arranged as a pair of upper spokes 30 and 32 and a pair of lower spokes 34 and 36. Each one of the four spokes 30–36 includes structure for helping to retain the air bag module 12 on the steering wheel 10. The four spokes 30–36 are identical to each other; therefore, only the spoke 30 is described in detail.

The spoke 30 (FIG. 3) has a radially inner portion 40 that has an upper surface 42. The upper surface 42 is presented toward the driver of the vehicle. The spoke 30 also has a radially outer portion or locking portion 44 that extends between the inner spoke portion 40 and the rim 20. (A radially outward direction is indicated by the arrow 45.)

The locking portion 44 of the spoke 30 has an upper external surface 46 that is presented toward the driver. The locking portion 44 of the spoke 30 is substantially thicker than the inner spoke portion 40. A shoulder surface 48 extends between the upper surface 46 of the locking portion 44 and the upper surface 42 of the inner spoke portion 40. In the illustrated embodiment, the shoulder surface 48 extends parallel to the axis 22.

The locking portion 44 of the spoke 30 has a lower external surface 50, opposite the upper external surface 46, that is presented away from the driver. First and second outer side surfaces 52 and 54 (FIG. 4) of the locking portion 44 extend between and interconnect the upper and lower surfaces 46 and 50. The side surfaces 52 and 54 are spaced apart circumferentially and define the circumferential edges of the locking portion 44 of the spoke 30.

The locking portion 44 of the spoke 30 has an opening 60 (FIGS. 1 and 2) in the shoulder surface 48. The opening 60 is located adjacent the upper surface 42 of the inner spoke portion 40. The opening 60 extends in the clockwise direction 26 from the first side surface 52, for most of the distance to the second side surface 54. Another opening 64 is formed in the first outer side surface 52 of the spoke 30. The opening 64 extends radially outward from the shoulder surface 48. At the shoulder surface 48, the opening 64 meets and connects with the opening 60.

The spoke 30 includes internal surfaces that define a slot 70 in the spoke. The slot 70 is accessible through the openings 60 and 64. One of these internal surfaces is an upper slot surface 72 (FIG. 4) that extends parallel to the upper surface 46 of the locking portion 44 of the spoke 30. The upper slot surface 72, and the opening 60, terminate at an internal end surface 74 (FIG. 5). The end surface 74 defines the clockwise circumferential end of the slot 70.

The internal surfaces in the locking portion 44 of the spoke 30 also include a lower slot surface 76 that extends generally parallel to the upper slot surface 72. Another internal surface 78 extends generally parallel to the rim 20 and defines the radially outer periphery of the slot 70. The surface 78 extends circumferentially between the opening 64 in the first side surface 52 and the end surface 74. The surface 78 is perpendicular to and extends between the upper and lower slot surfaces 72 and 76.

The lower slot surface 76 is interrupted by a rectangular access opening 80 (FIGS. 4 and 5). The surfaces defining the access opening 80 extend generally perpendicular to the lower slot surface 76. The access opening 80 provides access to the slot 70 from the lower surface 50 of the locking portion 44 of the spoke 30. A cam portion 82 (FIG. 4) of the spoke 30 is defined between the access opening 80 and the side surface 52.

The air bag module 12 (FIGS. 1 and 2) is a subassembly of parts that are interconnected separately from the steering wheel 10, then later connected with the steering wheel in a manner described below. The air bag module 12 has a central portion 90 and four arms 92, 94, 96 and 98 that extend radially outward from the central portion 90. Each one of the arms 92–98 of the air bag module 12 is connectable with a respective one of the spokes 30–36 of the steering wheel 10, as described below, to secure the module to the steering wheel. The four arms 92–98 of the air bag module 12 are identical to each other; therefore, only the one arm 92 that is engageable with the spoke 30 is described below.

The central portion 90 of the air bag module 12 (FIG. 2) includes an inflator illustrated schematically at 100. The air bag module 12 also includes an air bag indicated schematically at 102. The inflator 100 may contain an ignitable gas generating material for generating a large volume of inflation gas. The inflator 100 may alternatively contain a stored quantity of pressurized inflation fluid, or a combination of pressurized inflation fluid and ignitable material for heating the inflation fluid. The air bag module 12 also includes a cover 104. The air bag 102 is folded over the inflator 100 for storage in the cover 104.

The arm 92 (FIG. 3) has a radially inner portion 106 that overlies the inner portion 40 of the spoke 30 when the module 12 is installed on the steering wheel 10. The arm 92 has a radially outer portion in the form of a retainer tab 110 that is received in the slot 70 in the locking portion 44 of the spoke 30 when the module 12 is installed on the steering wheel 10. The overall dimensions of the retainer tab 110 are small enough to permit it to fit through the openings 60 and 64 into the slot 70 in the locking portion 44 of the spoke 30.

The retainer tab 110 has an upper side surface 112 and an opposite lower side surface 114. The lower side surface 114 has a rectangular spring clip recess 116. A radially outer end surface 118 of the retainer tab 110 extends between and interconnects the upper and lower side surfaces 112 and 114.

A rectangular spring clip 120 is mounted in the spring clip recess 116 in the lower side surface 114 of the retainer tab 110. A first end portion 122 of the spring clip 120 is fixed to the tab 110 by a pair of fasteners such as rivets 124. A first leg 126 of the spring clip 120 extends at an angle downward (as viewed in FIG. 4) and outward from the first end portion 122. A second leg 128 of the spring clip 120 extends downward (as viewed in FIG. 4) from the first leg 126, in a direction perpendicular to the plane of rotation 24. A third leg 130 of the spring clip 120 extends outward from the second leg 128, in a direction parallel to the plane of rotation 24. A fourth leg 132 of the spring clip 120 extends from the third leg 130 in an upward and outward direction as viewed in FIG. 4. A second end portion 134 of the spring clip 120 extends outward from the fourth leg 132 in a direction parallel to the plane of rotation 24.

The other arms 94, 96, and 98 of the air bag module 12 are similar in construction to the module arm 92. The module arm 94 has a retainer tab 140 that is engageable with a locking portion 142 on the spoke 32. The module arm 96 has a retainer tab 144 that is engageable with a locking portion 146 on the spoke 34. The module arm 98 has a retainer tab 148 that is engageable with a locking portion 150 on the spoke 36.

To mount the air bag module 12 to the steering wheel 10, the module is placed over the steering wheel in an uninstalled condition as shown in FIG. 1. The central portion 90 of the module 12 is disposed over the central portion 38 of the steering wheel 10. The module 12 is initially positioned relative to the steering wheel 10 so that the arms 92–98 of the module do not overlie the spokes 30–36 of the steering wheel. Thus, the retainer tabs 110, 140, 144 and 148 of the arms 92–98 of the module 12 are adjacent to, but spaced circumferentially from, the locking portions 44, 142, 146 and 150 of the spokes 30–36.

The module 12 is then rotated, or twisted, relative to the steering wheel 10, and about the axis 22, in the clockwise direction of rotation 26 parallel to the plane of rotation 24. During this relative rotation between the module 12 and the steering wheel 10, the retainer tabs 110, 140, 144 and 148 of the module arms 92–98, respectively, move into engagement with the locking portions 44, 142, 146 and 150 of the spokes 30–36, respectively.

The engagement of the module arm 92 and the spoke 30 is described as exemplary. As the module 12 is rotated about the axis 22, the retainer tab 110 of the module arm 92 revolves about the axis and moves circumferentially through the opening 64 in the first side surface 52, and through the opening 60 in the shoulder surface 48, into the slot 70 in the spoke 30. The retainer tab 110 itself moves relatively freely into the slot 70. The fourth leg 132 of the spring clip 120, however, contacts the cam portion 82 of the spoke 30 during this movement. The second end portion 134 of the spring clip 120 is cammed upward, toward the lower side surface 114 on the retainer tab 110. The spring clip 120 is then in a position to move completely into the slot 70 in the spoke 30.

As the tab 110 on the module arm 92 moves farther into the slot 70, the spring clip 120 resiliently snaps into the locked or blocking position shown in FIG. 4. The second, third and fourth legs 128, 130 and 132 of the spring clip 120 move into the access opening 80 in the locking portion 44 of the spoke. The engagement between the second leg 128 of the spring clip 120 and the cam portion 82 of the spoke 30 blocks movement of the spring clip out of the access opening 80, in the counter-clockwise direction 27 opposite to the direction of installation 26. Because the spring clip 120 is fixed to the retainer tab 110 of the module arm 92, the retainer tab 110 is thus prevented from moving out of the slot 70 in the locking portion 44 of the spoke 30.

Figure 2:
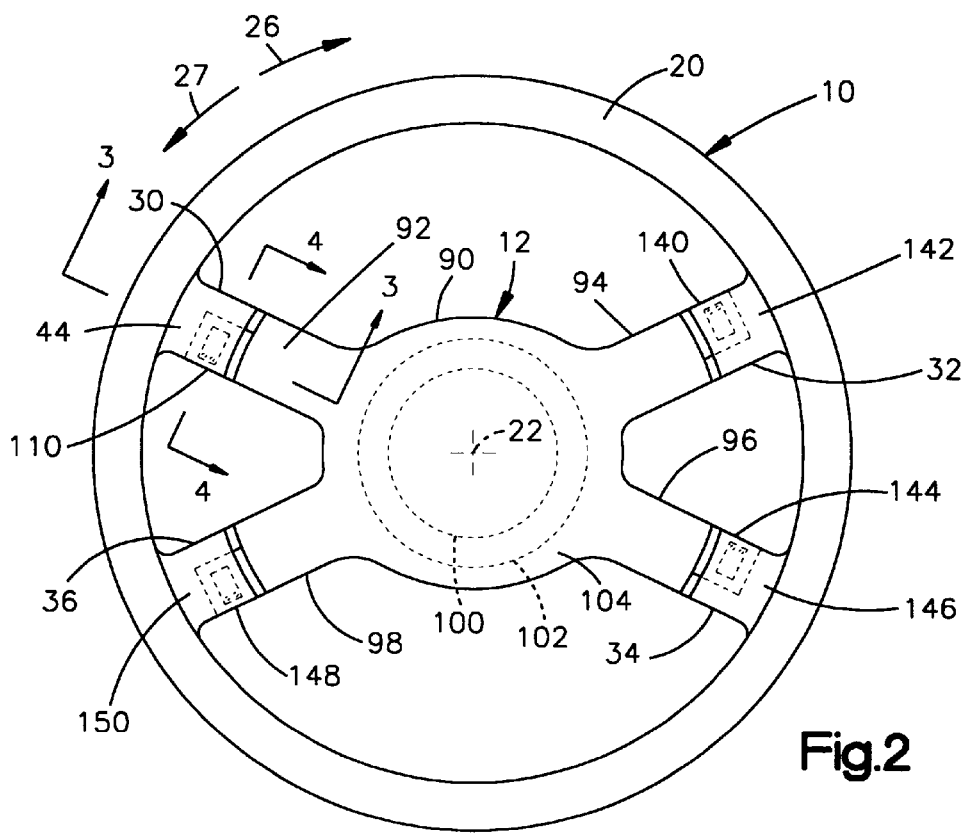
FIG. 2 is a view similar to FIG. 1 showing the air bag module in an installed condition on the steering wheel.

All four of the module arms 92–98 engage substantially simultaneously, and the module 12 is in an installed condition as shown in FIG. 2. The engagement of the four module arms 92–98 with the four spokes 30–36 blocks rotation of the module 12 relative to the steering wheel 10 in the counter-clockwise direction of rotation 27, opposite the clockwise direction of installation 26, from the installed condition to the uninstalled condition. The module 12 is thus securely fastened to the steering wheel 10 for rotation with the steering wheel.

It may be necessary for the module 12 to be removed from the steering wheel 10, for servicing or replacement. In this case, the spring clip 120 can be engaged through the access opening 80 in the spoke 30, and deflected toward the lower side surface 114 of the retainer tab 10, to enable the module to be rotated out of engagement with the steering wheel.

From the above description of the invention, those skilled in the art will perceive improvements, changes and modifications in the invention. For example, the locking features on the module and on the steering wheel could be reversed, so that the steering wheel would have a portion that would engage in a recess in the module. Also, the locking features could be located on the central portion of the steering wheel and the central portion of the module. Additionally, the spring clip could be replaced with a different type of fastener, for example, a threaded fastener that secures the retainer tab to the spoke in a standard manner. Such improvements, changes and modifications within the skill of the art are intended to be covered by the appended claims.

Having described the invention, I claim:

1. An apparatus comprising:

a steering wheel that can be mounted in a vehicle for rotation about a steering axis of the vehicle;

an air bag module including an air bag, an inflator for inflating said air bag, and a cover for covering said air bag and said inflator, said module having an uninstalled condition and having an installed condition on said steering wheel in which said module is fixed to said steering wheel for rotation with said steering wheel about the steering axis, said module being rotatable in a first direction relative to said steering wheel to move said module from the uninstalled condition to the installed condition; and retainer structure for retaining said module on said steering wheel and for blocking movement of said module relative to said steering wheel from the installed condition to the uninstalled condition.

2. An apparatus as set forth in claim 1 wherein said retainer structure comprises a tab on said module that is received in a slot in said steering wheel.

3. An apparatus as set forth in claim 1 wherein said retainer structure comprises a plurality of tabs on said module that are received in a respective plurality of slots in said steering wheel.

4. An apparatus as set forth in claim 1 wherein said retainer structure comprises a resilient member on a first one of said module and steering wheel that engages a portion of the other one of said module and steering wheel to block movement of said module relative to said steering wheel from the installed condition to the uninstalled condition.

5. An apparatus as set forth in claim 1 comprising a plurality of members on said module that snap into a blocking position in engagement with said steering wheel, upon rotation of said module in the first direction relative to said steering wheel.

6. An apparatus comprising:

an air bag module including an air bag, an inflator for inflating said air bag, a cover for covering said air bag and said inflator, and first retainer portions; and a steering wheel that can be mounted in a vehicle for rotation about a steering axis of the vehicle, said steering wheel having second retainer portions, said module having an uninstalled condition and having an installed condition on said steering wheel in which said module is fixed to said steering wheel for movement with said steering wheel, said first retainer portions on said module moving into engagement with said second retainer portions on said steering wheel upon rotation of said module relative to said steering wheel to retain said module on said steering wheel and to block movement of said module relative to said steering wheel from the installed condition to the uninstalled condition.

7. An apparatus as set forth in claim 6 wherein said second retainer portions on said steering wheel comprise a plurality of slots and said first retainer portions on said module comprise a plurality of tabs movable into said slots.

8. An apparatus as set forth in claim 7 comprising a plurality of fasteners for retaining said tabs in said slots.

9. An apparatus as set forth in claim 8 wherein said fasteners are spring clips.

* * * * *